United States Patent [19]
Annoot

[11] Patent Number: 4,637,001
[45] Date of Patent: Jan. 13, 1987

[54] PLUG-IN GEOPHONE CASE

[76] Inventor: Ira R. Annoot, 2610 Primrose, Houston, Tex. 77210

[21] Appl. No.: 676,642

[22] Filed: Nov. 30, 1984

[51] Int. Cl.⁴ .......................... H04R 1/02; G01V 1/16
[52] U.S. Cl. .................................... 367/177; 367/178; 367/188; 181/112; 181/122
[58] Field of Search ............... 367/177, 188, 173, 178, 367/79, 165, 154; 174/52 R; 339/151 C, 94 M, 94 A, 14 P; 181/112, 122

[56] References Cited

U.S. PATENT DOCUMENTS

| | | | |
|---|---|---|---|
| 2,654,077 | 9/1953 | McLoad | 367/188 X |
| 2,908,890 | 10/1959 | Campbell et al. | 367/188 X |
| 2,958,842 | 11/1960 | Schaefer | 339/94 M |
| 3,119,978 | 1/1964 | Sears | 174/154 |
| 3,591,835 | 7/1971 | Sloop | 174/52 X |

Primary Examiner—Charles T. Jordan
Assistant Examiner—John W. Eldred
Attorney, Agent, or Firm—Dodge, Bush & Moseley

[57] ABSTRACT

In accordance with an illustrative embodiment of the present invention, a plug-in geophone case includes a body having an open top and a cavity that receives a seismic detector having positive and negative terminals, receptacles on opposite sides of said body for plugging the case into leader cables, a set of three connector pins molded in the case adjacent each receptacle, one end of each pin extending into a receptacle and the other end extending into a recess in the body adjacent one of said terminals, a cover plate for closing the open top of said case, and means for sealingly fastening a connector plug in each of said receptacles, said plugs and receptacles having mating means to prevent connection with the wrong polarity.

15 Claims, 6 Drawing Figures

U.S. Patent   Jan. 13, 1987   4,637,001
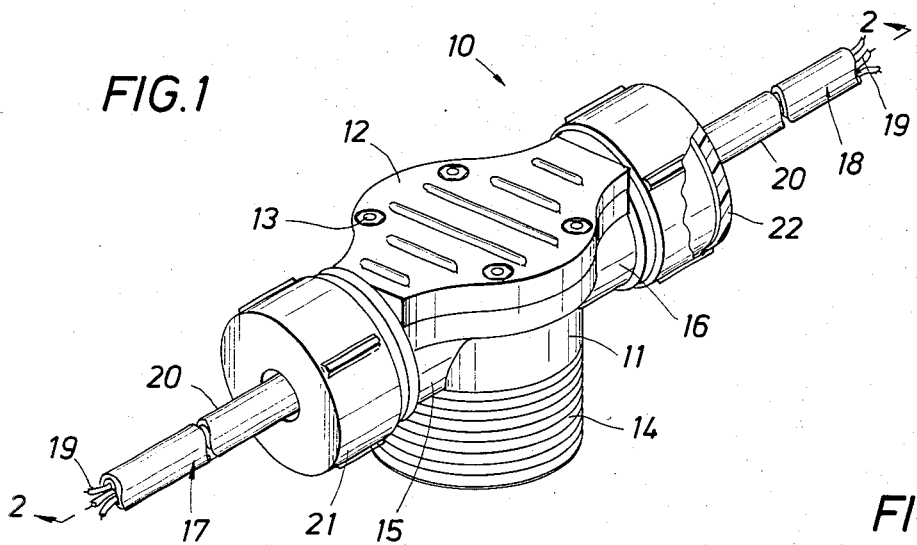
FIG. 1
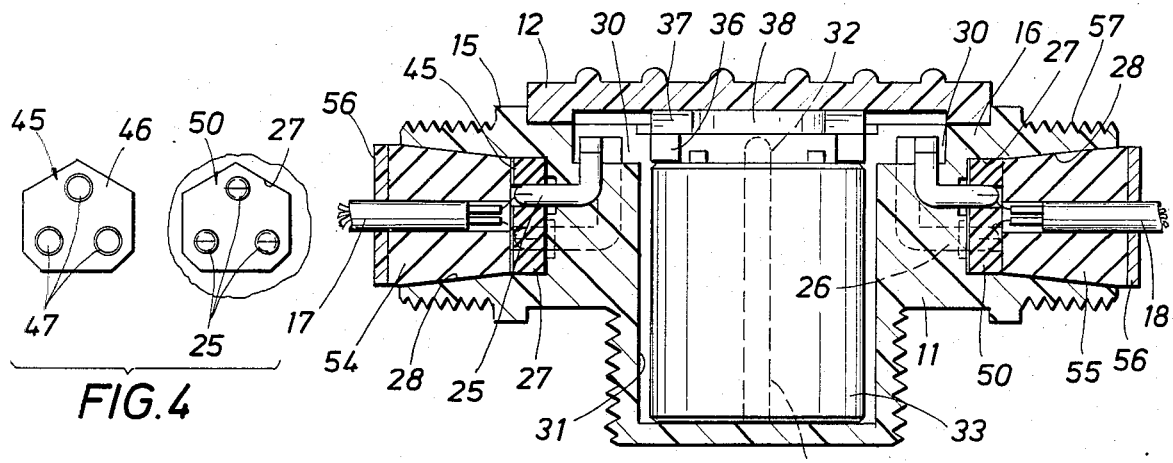
FIG. 2
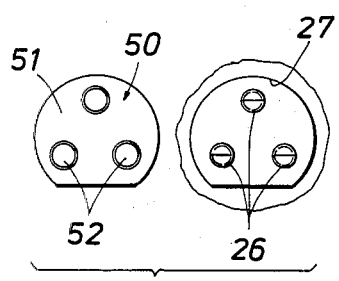
FIG. 4
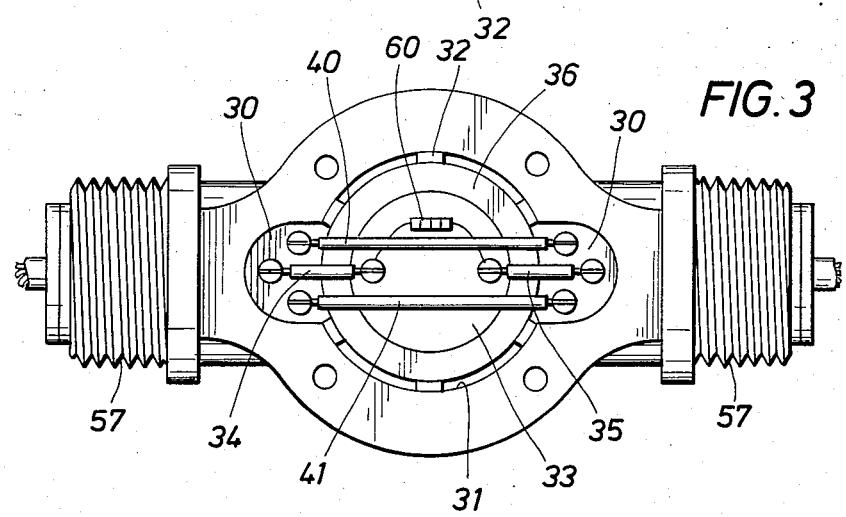
FIG. 3
FIG. 5
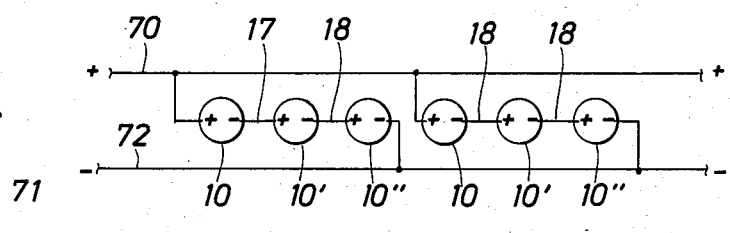
FIG. 6

PLUG-IN GEOPHONE CASE

FIELD OF THE INVENTION

This invention relates generally to geophones used in seismic exploration, and particularly to a new and improved geophone apparatus that can be readily plugged into leader cable to enable ease of field service when connecting together a new geophone string or when replacing damaged leader sections.

BACKGROUND OF THE INVENTION

In seismic exploration for oil and gas, an energy source such as an explosive or a large vibrator imparts an elastic deformation to the earth which propogates radially downward and outward through the earth formations. At levels where there is a significant change in acoustic impedance of rock layers, a portion of the energy is reflected and travels back upward to the surface, where minute movement of earth particles occur at the free boundary between the earth and the atmosphere.

A seismic detector, commonly refered to as a geophone, positioned at the ground surface is used to convert particle motion into an electrical output signal. Typically a number of such geophones are laid out in a line with individual phones being connected together by leader cable sections to provide a group of 6-24 phones (usually 12) in a string. The leader is electrically connected to a recording instrument, and after passing through suitable signal conditioning apparatus the data is recorded on magnetic tape for subsequent processing and interpretation.

The length of the leader cable sections determines the geophone spacing, which in the United States Gulf Coast area normally is a 25 foot separation. On the other hand, in West Texas the geophones may be replaced 50-60 feet apart in order to provide more effective cancellation of undesirable horizontally propogating interference signals of longer wave lengths. In any event the geophysical crew that conducts the survey is faced with a number of practical problems in properly laying out the geophone strings, and in servicing strings by replacement of leader cable sections which have been damaged, for example, in handling. The leader typically has three insulated conductors that are twisted together and enclosed in a common jacket.

Other problems that are encountered involve properly anchoring the geophones to the leader cable in a manner to protect the integrity of electrical continuity of the cable conductors and the geophone terminals, providing a protection for the geophones from the environment, and insulation from ground. Of course it will be recognised that the motions of the earth may be minute, and consequently the geophones have a very low signal output level, such that AC power lines in the area can provide an interference which recuces the signal-to-noise ratio in a highly undesirable manner. In fact, one of the biggest problems that faces the seismic field crew is the maintenance of a high level of electrical isolation between the signals generated by the geophones, and interferring electrical noise that is present in the area being surveyed. Particularly troublesome is the 60 Hz noise radiated by the grid of electrical power lines that cover most of the United States.

Pickup of electrical noise signals by the leader wire, and the internal electrical circuits of the geophones themselves, is greatly amplified by the presence of moisture. If moisture gets into the geophone case, or past the conductor insulation through cuts or holes in the jacket and the insulation, the use of the string is considerably impaired and often renders the seismic data unusable. As a result, new and better ways have been continually sought to prevent any electrical leakage to earth ground of the electrical signals generated by the geophones and carried by the leader wire or cable.

Users also are continually seeking better ways for servicing and repairing faulty geophone strings. Faults develop due to defective geophones, pieces of leader wire becoming cut or broken, and from both geophones and wires being damaged through inadvertent encounters with heavy field equipment and harsh environments. No matter how sturdy or rugged the geophone strings may be, and no matter how much care is exercised by the field crew in handling the equipment, damage and breakdown does occur so that field repairs must be made.

A known method of facilitating replace of defective geophones involves the use of plug-in connectors that are molded to the leader cable at each geophone station. This method permits easy replacement of defective phones by opening the case and then simply unplugging the element and plugging in a new element in its place. However, there are some serious disadvantages to the use of this technique. This type of repair can be quite costly, and it may not be possible to make field repairs or replacements of the plug-in connector which is molded to the geophone leader cable. Thus where a serious break or cut occurs in a section of the leader cable, it was often necessary to throw away the entire length of leader, including the expensive connectors which are molded thereto.

Another disadvantage of the molded plug-in connector is the relative inflexibility of such an arrangement with respect to spacing. If the user encounters a prospecting or survey area where the desired spacing between adjacent geophones of a string is greater that the distance between the molded connectors on the leader, there is as a practical matter no way to overcome the problem. Such inflexibility also is a problem if the user needs to change the electrical interconnection between geophones in a string. This means that the geophone spacing must be selected prior to molding of the plug-in connectors, and once the string is fabricated, the electrical hook-up can not be changed.

In view of the disadvantages of the molded plug-in connector approach discussed above, this technique is no longer favored by users and has been substantially abandoned.

As mentioned above, another significant problem area has been the difficulties encountered in obtaining an adequate seal around the solder joint connections between the geophone terminals and the leader conductors so that the phone is isolated from the atmosphere. If the seal is inadequate, then any moisture that enters the case can cause electrical leakage to ground and the generation of spurious electrical noise. On the other hand, if the solder joint is potted in a sealing compound, it becomes very difficult to unsolder the connections, which is necessary when a defective geophone or length of leader wire is to be replaced. Various techniques have been tried in efforts to solve this problem, with perhaps the most widely used technique being to pot the connections in a silastic rubber compound that is more easily removed than certain other types of potting compounds. However, the seal against moisture entry is not as effective as would be desirable, and on-site repotting by field crews after the making of repairs is a source of additional problems.

Another prior sealing technique uses gaskets rather than potting compounds, and this technique has gained some degree of favor. However, gaskets do not provide a seal for the basic geophone element itself, and moisture that enters the case via a damaged leader wire, or any other source, can cause electrical leakage and, in more severe cases, rusting of the geophone element.

It will be recognized from the foregoing discussion that prior methods for stringing geophones have encountered a sizeable number of problems, particularly when it is necessary for the seismic crew itself to make field repairs, regardless of whether the problem is a damaged leader section, a faulty geophone element, or a damaged case. In any event it has been necessary for the field crew to open the geophone case and then make a repair that is appropriate to the problem. Experience has taught users that the necessity for a crewman to open the case as an incident to repair is not satisfactory. The geophone is a precision instrument that must be electrically connected in the string in a precise, correct number. The repaired or replaced geophone must not be connected in a manner that produces reversed electrical polarity, and the case must be repotted or a sealing gasket installed in a manner such that dirt or other foreign matter which could lead to a poor seal and electrical leakage is not introduced. As can be readily appreciated, the typical seismic field crew would normally lack the expertise and technical knowhow necessary to make an adquate field repair, and effective and efficient repair facilities are usually not available to a crew that makes frequent moves from one location to another. Therefore, problems have continued to exist in prior art methods and techniques for effecting repairs on geophone strings.

It is the general object of the present invention to provide a new and improved geophone apparatus that obviates the foregoing problems.

SUMMARY OF THE INVENTION

This and other objects are attained in accordance with the concepts of the present invention through the provision of seismic apparatus comprising leader means for electrically interconnecting a plurality of seismic detectors in a string having a selected spacing between detector stations, and seismic detector means at each station for converting earth motion to analagous electrical signals. Each of the detectors is housed in a case that is constructed and arranged to provide a water-tight seal at the point where the leader enters the case, as well as a seal around the electrical connections between the leader conductors and the detector. The case provides a protection for the detector, and is anchored to the earth in a manner to provide an acoustic coupling therewith, and to enable the case to the pulled out of the ground by pulling on the leader.

In accordance with the present invention, the case is provided with a three pin connector on each side thereof at the points of leader entry. The terminals of the connector are molded into the case and made an integral part thereof. Mating connectors are provided on the opposite ends of the leader cable sections, and receptacles are provided in the case to accept the mating connectors. The connectors and receptacles are uniquely arranged to provide a polarizing feature which prevents hook-ups of the wrong polarity. Thus the seismic detectors are completely sealed off from the environment, and the geophones cases are plugged into selected length leader sections to provide a string having a preselected geometry.

The present invention provides a convenient, workable means for the replacement of an entire geophone assembly comprising the geophone, its case, and the case seal, by simply disconnecting the connector on each side of the case, and then replacing the entire assembly. There is no need to open the case. Selected lengths or leader cable can be prefabricated with a connector on each end, and the field crew can replace damaged leader sections without disturbing the geophone case seal. Thus no particular expertise is required by the field crew.

BRIEF DESCRIPTION OF THE DRAWINGS

The present invention to other objects, features and advantages which will become more clearly apparent in connection with the following detailed description of a preferred embodiment, taken in conjunction with the appended drawings, in which.

FIG. 1 is a three-dimensional view of a geophone assembly constructed in accordance with the present invention;

FIG. 2 is a cross-section taken on line 2—2 of FIG. 1;

FIG. 3 is a top view of the apparatus with the cover plate removed;

FIG. 4 contains side-by-side views of tbhe receptacle and plug on one side of the case;

FIG. 5 is a view similar to FIG. 4 of the receptacle and plug on the other side of the case; and FIG. 6 is a schematic representation of a geophone string.

DETAILED DESCRIPTION OF A PREFERRED EMBODIMENT

Referring initially to FIG. 1, a geophone assembly that is constructed in accordance with the principles of the present invention in indicated generally at 10. The assembly 10 includes a body 11 having an internal cavity that houses a cylindrical seismic detector element, and a removable cap 12 that is secured to the body 11 by several bolts 13. The lower portion on the body 11 is externally threaded at 14 for reception of an anchor spike or the like (not shown), and the bottom of the body is closed. The body 11 may be formed of any suitable injection molded, hard plastic that is lightweight and provides electrical insulation from ground.

A tubular receptacle 15 extends from one side of the body 11, and another tubular recptacle 16 extends from the opposite side of the body. The receptacle 15 is arranged to receive a connector on the end of a section of leader cable 17, whereas the other receptacle 16 is arranged to receive a connector on the end of another section of leader cable 18. Each leader section has three insulated conductors 19 that are twisted together inside an insulating jacket 20. As will be described in greater detail below, the connectors are held in mating engagement with the receptacles by retainer caps 21 and 22 that are threaded onto the tubular receptacles 15 and 16.

As shown in FIG. 2, sets of three generally L-shaped pins 25, 26 are molded into the body 11 and positioned so that the outer ends of the pins project into internal recesses in the receptacles, each of which has a cylindrical portion 27 and an outwardly inclined conic section 28. The upper ends of the pins 25, 26 project into semicircular recesses 30 at the opposite upper edges of the body cavity 31, thereby forming sets of three terminals each disposed to either side of the cavity.

The walls of the cavity 31 can be provided with inwardly extending ribs 32 that engage the outer walls of a cylindrical detector element 33. The element 33 is of conventional construction that is sensitive to particle velocity so as to sense movement of the earth in response to the passage of acoustic energy. The upper end of the detector 33 crystal has a pair of terminals of opposite polarity, with one terminal being connected to the center one of the set of pins 26 by a conductor 34, and the other terminal being connected to the center one of the other set of pins 27 by a conductor 35.

A spacer ring 36 rests against the upper outer edge of the detector 33 in order to hold it snugly in place. The cap 12 is provided with arcuate guide flanges 37 on the opposite sides of a longitudinally extending recess 38. The flanges 37 fit into the cavity 31 in the body 11 and engage the spacer ring 36 in order to hold it firmly in place. One pair of the pin terminals are connected by an insulated conductor wire 40, and the remaining pair by an insulated conductor 41, with all the conductors extending through the clearance space provided by the longitudinal recess 38 in the cap 12.

As shown in FIG. 4, the cylindrical portion 27 of the receptacle 15 is provided with the shape of an irregular polygon. The plug 45 at the end of the leader section 17 is constituted by a thin plastic wafer 46 having a correspondingly shaped outer surface, and the sockets 47 are rotationally oriented with respect to sides of the wafer such that the plug can be mated with the pins 25 in only one position to provide the proper match and electrical connections between the conductors 34, 40, 41 in the case 10 and the three conductors within the leader section 17.

As show in FIG. 5, the cylindrical portion 27 in the other tubular receptacle 16 has a circular section except for a flat at the lower side wall thereof. The plug 50 at the end of the leader section 18 includes a thin wafer 51 having a correspondingly shaped outer surface, with the sockets 52 being rotationally oriented with respect to the flat such that this plug can be mated with the pins 26 in only one rotational position to provide the proper match and electrical connections between the conductors 35, 40, 41 in the case 10 and the three conductors within the leader section 18.

Tapered elastomer sealing plug 54, 55 are mounted on the leader sections 17, 18 immediately behind the respective plugs 45 and 50, and are followed by a plastic washer 56. The plugs fit into the conic portions 28 of the receptacles and are wedged tightly therein as the retainer caps 21, 22 are screwed onto the external threads 57 of the tubular receptacles.

OPERATION

In operation, the geophone assemblies 10 are assembled and connected to the leader wire sections 17, 18 in the following manner. The geophones are put together by positioning a detector element or transducer 33 within the cavity 31 of the body 11 with its positive terminal adjacent the pins 25 and its negative terminal adjacent the pins 26. The spacer ring 36 is placed on top of the detector 33.

A resistor 60 is connected across the detector terminals, and the short lengths of insulated conductors 34, 35 having a particular color, for example, red are soldered as shown to connect the respective terminals to the center ones of the pin sets 26, 27. The longer conductor 40 having, for example, white insulation, is soldered to the upper pair of the pins 26, 27, and the second longer conductor 41 having for example, green insulation, is connected by soldering between the lower pair of the terminal pins. A wax or other suitable nonconductive potting material can be poured around the resistor 60 and its leads to inhibit movement thereof and to seal cover plate 12 and body cavity 31. The cover plate 12 then is positioned to close the body cavity 31, and the bolts 13 are inserted and the nuts tightened to hold the cover plate securely in place with its guide flanges 37 resting against the spacer ring 36. A suitable anchor spike or the like is attached to the threads 14 on the lower outer end of the body 11 to complete the assembly of the phone.

It will be noted that the positive terminal on the detector element 33 is connected to the center pin of the set 26 which extends into the receptacle 15 having the irregular polygon recess 27 so that the user can connect to these pins only the connector plug 45. Conversely the negative terminal of the crystal 33 is connected to the center pin terminal in the pin set 27 which extends into the receptacle 16 having the circular recess with flat, so that the user can connect to the pins 27 only the connector plug 50. The leader cable sections 17, 18 are provided to the user in predetermined lengths depending upon the spacing that is desired between geophones in a group, with the plugs 45 and 50 already soldered and connected to the leader wire conductors in preferably the same color code arrangement as the conductors inside the geophone case.

FIG. 6 shows schematically how a "3-2 series-parallel" string of geophones would be laid out for use in the field. A series of three geophones 10, 10' and 10" are coupled together by leader sections 17 having a selected length such that the geophones are spaced, for example, 20 feet apart. Another series of geophones 10, 10' and 10" also are spaced 20 feet apart by leader sections 18, and of course the adjacent phones 10" and 10 are positioned on the same spacing, so that the total group length is 100 feet. The positive terminals of the geophones 10 are connected to a conductor wire 70 in a "lead-in" section 71 which extends to the data processing equipment, and the negative terminals of the phones 10" are connected to a conductor 72 in the section 71. The respectie negative and positive terminals of the phones 10, 10' and 10" are connected to one another as shown. Thus the entire phone group may be described as two series of three geophones each, connected in parallel across the lead-in conductors 70 and 72.

Acoustic waves passing upwardly through the earth from an underground reflective surface arrive at the first series of geophones substantially simultaneously and cause output signals that are additive on the line 70, and the same thing happens at the next series of geophones but at a slightly later time due to normal moveout. The arrival times can be interpreted in a conventional manner to construct a map of subterranean features that is useful in exploration for oil and gas. The lengths of the respective leader sections 17, 18 can be chosen to provide for optimum sensitivity depending upon the geological region being surveyed.

It now will be recognized that a new and improved geophone apparatus that can be easily plugged into predetermined lengths of leader cable to enable ease of field service has been disclosed. The case of the geophone is completely sealed to prevent entry of moisture and consequent grounding problems that have existed in this art. The leader cable can be made in discrete segments that can be readily replaced in the event of damage with a minimum of effort and expense. Greater or longer lengths of leader cable can be used to obtain a desired spacing between geophones in a group, so that design of geophone strings for maximum performance in a given geographical region is greatly simplified. The solder connections between leader cable and detector elements crystals are completely sealed off from the atmosphere to obviate electrical leakage problems and minimize the generation of spurious electrical noise. The connections are not potted with various compounds, which greatly alleviates problems in field repair by inexperienced personnel. Sections of the leader cable can be replaced to effect repairs without having to open the geophone case. The electrical connections between the ends of the leader and the geophones are designed in a manner to prevent hook-ups with the wrong polarity, so that the overall system is as foolproof as is practically possible for field use and repair.

Since certain changes and modifications may be made in the disclosed embodiment without departing from the inventive concepts involved, it is the aim of the appended claims to cover all such change and modifications falling within the true spirit and scope of the present invention.

What is claimed is:

1. Geophone apparatus comprising: a body having an open top and a cavity that receives a seismic detector having positive and negative terminals; receptacle means on opposite sides of said body for use in plugging said case into prefabricated lengths of leader cable; a first set of three connector pins molded in said body adjacent said cavity, one end of each of said pins of said first set projecting into one of said receptacle means and the other ends thereof projecting into a recess formed in said body adjacent one of said terminals; a second set of three connector pins molded in said body adjacent said cavity, one end of each on said pins of said second set projecting into the other of said receptacle means and the other ends thereof projecting into a recess formed in said body adjacent the other of said terminals; a cover plate for closing the open top of said body; and means for sealingly connecting a connector plug in each of said receptacle means.

2. The apparatus of claim 1 wherein each of said receptacle means is provided with polarizing means to prevent mating therewith of an associated connector with the wrong polarity.

3. The apparatus of claim 2 wherein said polarizing means for said one receptacle means is structurally different from the polarizing means of said other receptacle means, whereby each of said receptacle means can be mated only with a companion connector on the end of a leader cable section.

4. The apparatus of claim 1 wherein said cap has arcuate guide flanges on the lower side thereof that are arranged to fit into the top portion of said cavity, said flanges being separated by a recess means in said cap that extends between the recesses formed in said body on opposite sides of said cavity.

5. The apparatus of claim 4 further including a guide ring positioned between the upper outer edge of said detector and lower surfaces of said guide flanges on said cap.

6. The apparatus of claim 5 further including first conductor means for connecting the respective positive and negative terminals of said detector to a selected one of the pins in each of said sets, second conductor means for connecting a second pair of the pins of said sets, and third conductor means for connecting the remaining pair of conductors of said sets, said first, second, and third conductor means extending through said body recesses and said recess means in said cap and between said spacer ring and said cap.

7. A geophone assembly comprising: a plurality or geophone assemblies each including a body having a detector element received in a cavity therein, said detector elements having terminals of opposite polarity, each of said bodies having receptacle means on opposite sides thereof; and a first set of connector means molded into each said bodies for providing an electrical feed-through from one of said receptacle means to said cavity, and a second set of connector means molded into each of said bodies for providing an electrical feed-through from the other of said receptacle means to said cavity; a cap releasably secured to each of said bodies for enclosing the said cavities therein and said detector elements; a plurality of first leader cable sections having plug means at their opposite ends; first polarizing means on each of said one receptacle means and on a plug means on the end of each of said first leader sections for enabling said plug means to be mated only with said one receptacle means; a plurality of second leader cable sections having plug means at their opposite ends; and second polarizing means on said other receptacle means and on a plug means on the end of each of said second leader cable sections for enabling said last-mentioned plug means to be mated only with said second receptacle means, whereby said leader sections cannot be plugged into said receptacle means on said bodies except in a prescribed manner.

8. A geophone apparatus comprising: a body having a cavity therein adapted to receive a detector having terminals of opposite polarity; receptacle means on opposie sides of said body arranged to receive a mating connector on the end of a leader section; a first set of connector means molded into said body for providing electrical feed-through from one of said receptacle means and to one terminal of said detector; and a second set of connector means molded into said body for providing electrical feed-through from the other of said receptacle means to the other terminal of said detector, each of said connector means being adapted to be mated with a companion connector on the end of a leader cable section having a prescribed length.

9. The apparatus of claim 8 wherein each of said receptacle means is provided with polarizing means to prevent mating of a connector on the end of the leader cable section with said connector means in a manner other than the correct polarity.

10. The apparatus of claim 9 further including seal means on each receptacle means for substantial isolating the connections with the ends of a leader cable section from the environment.

11. The apparatus of claim 10 further including cap means for closing said cavity in a manner to isolate said detector from the environment.

12. The apparatus of claim 8 wherein each of said first and second connector means comprises a set of three pins, one end of each pin of one of said sets extending into said one receptacle means, and the other end thereof extending into said cavity adjacent one of said terminals of said detector, one end of each pin of the other of said sets extending into said other receptacle means and the other end thereof extending into said cavity adjacent the other of said terminals of said detector.

13. The apparatus of claim 12 further including surface means in each of said receptacle means for enabling an electrical connection to be made with said one ends of said pins only with a predetermined polarity.

14. The apparatus of claim 13 further including first conductor means for connecting one pin of each set with a respective terminal of said detector; second conductor means for connecting another pin of each set with one another; and third conductor means for connecting the remaining pin of each set with one another.

15. The apparatus of claim 8 wherein said body and receptacle means are formed of a light-weight, nonconductive plastic material.

* * * * *